UNITED STATES PATENT OFFICE.

GEORG MERLING AND OTTO CHRZESCINSKI, OF ELBERFELD, AND HUGO KÖHLER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING KETO COMPOUNDS FROM KETONES AND ALKYLAMINO-METHANES.

1,094,159.  Specification of Letters Patent.  Patented Apr. 21, 1914.

No Drawing.    Application filed May 16, 1913.  Serial No. 768,071.

*To all whom it may concern:*

Be it known that we, GEORG MERLING, OTTO CHRZESCINSKI, and HUGO KÖHLER, doctors of philosophy, chemists, citizens of the German Empire, residing at, respectively, Elberfeld and Leverkusen, near Cologne-on-the-Rhine, Germany, have invented new and useful Improvements in Processes of Producing Keto Compounds from Ketones and Alkylaminomethanes, of which the following is a specification.

The invention described in Patent No. 1,070,622 August 19, 1913, concerns the production of keto compounds containing for instance the radical:

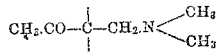

which have proved to be valuable intermediate products for the manufacture of erythrene and its homologues. It has now been found that the homologues of the dimethylaminooxymethane and of the tetramethyldiaminomethane can also be used for this process. The process for their production proceeds in the same manner as described in U. S. P. 1,070,622 of August 19, 1913, namely, by treating acetone and its homologues with a dimethylaminomethane compound, and more particularly with dialkylaminooxymethane or tetraalkyldiaminomethane, either with or without condensing agents, etc. These reactions proceed *e. g.* according to the following equations:

(1) $CH_3-CO-CH_2(R)+HO-CH_2-N(R')_2 \rightleftarrows CH_3-CO-CH(R)-CH_2-N(R')_2+H_2O$.

(2) $CH_3-CO-CH_2(R)+(R')_2N-CH_2-N(R')_2 \rightleftarrows CH_3-CO-CH(R)-CH_2-N(R')_2+NH(R')_2$ (R=hydrogen or alkyl, R'=alkyl).

Besides these products ketodiamins of the formula:

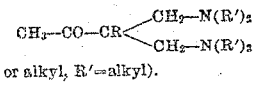

(R=hydrogen or alkyl, R'=alkyl).

are obtained for instance by the two-fold introduction of the residue $CH_2N(R')_2$ into the corresponding ketone. These ketodiamins can be separated from the ketomonoamins by fractional distillation.

In order to illustrate the new process more fully the following examples are given, the parts being by weight:

*Example 1*—Production of beta-acetylethyldiethylamin

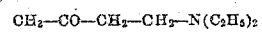

and beta-acetyltrimethylenetetraethyldiamin

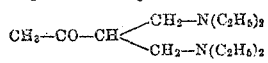

from diethylaminooxymethane and acetone: 146 parts of an aqueous diethylamin solution (50 per cent.) are gradually dropped into 75 parts of aqueous formaldehyde (40 per cent.) which has to be well stirred and cooled and the solution of diethylaminooxymethane thus obtained is mixed with 200 parts of acetone, 40 parts of baryta water (saturated at ordinary temperature) and 50 parts of water. This solution is heated for several weeks in an autoclave at 20–30° C. until diethylaminooxymethane can no longer be perceived. The baryta is then removed from the brown solution by saturation with carbonic acid or by addition of bicarbonate and the oil is separated from the aqueous solution by potash and dried over potash. The excess of acetone is removed by distillation *in vacuo* and the remaining mixture of bases is decomposed by a fractional distillation *in vacuo* to beta-acetylethyldiethylamin and beta-acetyltrimethylenetetraethyldiamin. The former base is a colorless oil having an intense ammoniacal smell, difficultly soluble in water and boils at 72–76° C. (16 mm.), the latter one represents a colorless and odorless oil with a little yellow coloration boiling at 95–100° C. (7–8 mm.).

*Example 2*—Production of beta-acetylethyldiethylamin and beta-acetyltrimethylenetetraethyldiamin from tetraethyldiaminomethane and acetone: 750 parts of aqueous formaldehyde (40 per cent.) are gradually dropped into 3245 parts of aqueous diethylamin solution (45 per cent.) which is being stirred and cooled and 2000 parts of acetone, 400 parts of baryta-water (saturated at ordinary temperature) and 500 parts of water are then added. After 20 days' heating from 25–30° C. bicarbonate is added to the brown solution in order to remove the baryta. Barium carbonate is removed by filtration. The oil is separated with potash from the filtrate, dried and worked up as described in the preceding example.

Example 3—Production of beta-acetyl-propyldiethylamin $$CH_3-CO-CH(CH_3)-CH_2-N-(C_2H_5)_2$$

and beta-beta-acetyl-methyl-trimethylene-tetraethyldiamin

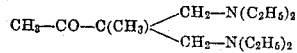

from diethylaminooxymethane and methylethylketone: 146 parts an aqueous diethylamin solution (50 per cent.) are gradually dropped into 75 parts of aqueous formaldehyde (40 per cent.) which has to be well stirred and cooled and this solution is then mixed with 216 parts of methylethylketone and 50 parts of sodium lye (0.3 per cent.). When the mixture is allowed to stand for several days at ordinary temperature the reaction is finished. The free alkali is removed from the brown solution by saturation with carbonic acid or by addition of bicarbonate and the oil is separated from the aqueous solution by potash and dried over potash. The excess of methylethylketone is now distilled off advantageously under somewhat reduced pressure in an apparatus suitable for fractional distillation and the remaining mixture of bases is decomposed by a fractional distillation *in vacuo* to beta-acetyl-propyl-diethylamin and beta-beta-acetyl-methyl-trimethylenetetraethyldiamin. The former represents a colorless oil with a little ammoniacal smell, difficultly soluble in water, boiling at 77–78° C. (16 mm.), the latter is a thick, yellowish almost odorless oil which boils at 105–110° C. (7 mm.)

The sodium lye can be replaced with the same success by baryta-water.

Example 4—Production of the same bases with the aid of tetraethyldiaminomethane: 292 parts of an aqueous diethylamin solution (50 per cent.) are gradually dropped into 75 parts of aqueous formaldehyde (40 per cent.) while well stirred and cooled. This mixture forming two layers, is mixed with 210 parts of methylethylketone and boiled on the reflux condenser for so long a time until a test portion after acidulation with acetic acid is not any more rendered turbid by a solution of anilin acetate which requires about some hours. The solution is then dehydrated with potash and worked up in the same manner as described in Example 1, whereby the same result is obtained as described in this example.

The methylethylketone can be naturally replaced with the same success by acetone. In the same manner the mixed tetraalkyldiaminomethanes, obtained from two different dialkylamins, a molecule of formaldehyde in aqueous solution and acetone or its homologues can be used. A mixture of the known keto bases:

$$CH_3-CO-CH(CH_3)CH_2-N(CH_3)_2$$

and $$CH_3-CO-CH(CH_3)CH_2-N(C_2H_5)_2$$

are obtained for instance when dimethyldiethyldiaminomethane:

$$(CH_3)_2-N-CH_2-N(C_2H_5)_2$$

is condensed with methylethylketone according to the process of Example 3.

It will be seen that the above keto compounds contain the radical or nucleus graphically represented:

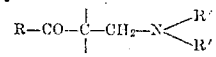

where R is alkyl, *e. g.*, methyl, and where R' represents alkyl, *e. g.* ethyl or other alkyl groups having more than one carbon atom therein.

In our copending application Serial No. 768,072 we have claimed specifically the use of the higher tetraalkyldiaminomethane for forming the above described keto compounds, while the claims of the present application are drawn generically to the use of the higher dialkylaminomethane compounds and specifically to the use of the higher dialkylaminooxymethanes, such as diethylaminooxymethane, etc.

We claim:—

1. The process of producing a polyalkyl-amino-substituted keto compound which comprises reacting on a ketone with a dialkylaminomethane compound in which the alkyl groups contain more than one carbon atom.

2. The process of producing a dialkylamino substituted-ketone which comprises reacting on a ketone with dialkylaminooxymethane in which the alkyl groups contain more than one carbon atom.

3. The process of producing a polyalkyl-amino-substituted keto compound which comprises reacting on a ketone with a dialkylaminooxymethane compound in which the alkyl groups contain more than one carbon atom with the addition of a condensing agent.

4. The process of producing a dialkylamino-substituted keto compound which comprises reacting on a ketone with dialkylaminooxymethane in which the alkyl groups contain more than one carbon atom with the addition of a condensing agent.

5. The process of producing a polyalkyl-amino-substituted keto compound which comprises reacting on a ketone with a dialkylaminomethane compound in which the alkyl groups contain more than one carbon atom with the addition of an inorganic base as a condensing agent.

6. The process of producing a polyalkylamino-substituted ketone which comprises reacting on a ketone with dialkylaminooxymethane in which the alkyl groups contain more than one carbon atom with the addition of an inorganic base as a condensing agent.

7. The process of producing keto compounds containing the group:

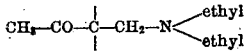

which comprises treating a methyl ketone with a diethylaminomethane compound.

8. The process of producing keto compounds containing the group:

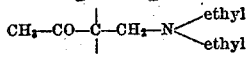

which comprises treating a methylketone with diethylaminooxymethane.

9. The process of producing keto compounds containing the nucleus

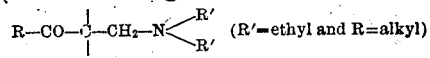

which comprises treating a methyl-ketone with a diethylaminomethane compound.

10. The process of producing keto compounds containing the nucleus

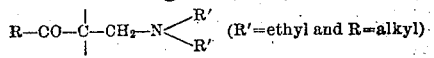

which comprises treating a methylketone with a diethylaminomethane compound with the addition of an inorganic base as a condensing agent.

11. The process of producing keto compounds containing the radical or nucleus

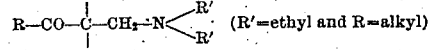

which comprises treating a ketone with diethylaminooxymethane.

12. The process of producing keto compounds containing the radical or nucleus

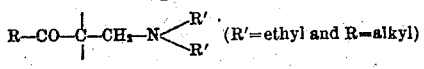

which comprises treating a ketone with diethylaminooxymethane with the addition of a condensing agent.

13. The process of producing keto compounds containing the group:

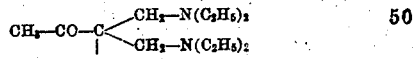

which comprises treating a methyl ketone with a diethylaminomethane compound until the two-fold introduction of the group $$-CH_2-N(C_2H_5)_2$$

has been effected.

14. The process of producing keto compounds containing the group:

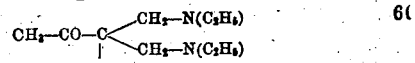

which comprises treating a methyl ketone with diethylaminooxymethane until the two-fold introduction of the group:

$$-CH_2-N(C_2H_5)_2$$

has been effected.

In testimony whereof we have hereunto set our hands in the presence of two subscribing witnesses.

GEORG MERLING. [L. S.]
OTTO CHRZESCINSKI. [L. S.]
HUGO KÖHLER. [L. S.]

Witnesses:
HELEN NUFER,
ALBERT NUFER.